June 28, 1960 B. J. McDONALD 2,942,521
HEADLIGHT REFLECTOR FOR HIGHWAYS
Filed Feb. 14, 1958 2 Sheets-Sheet 1
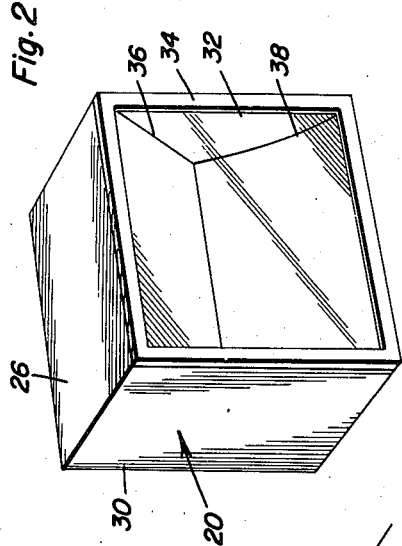
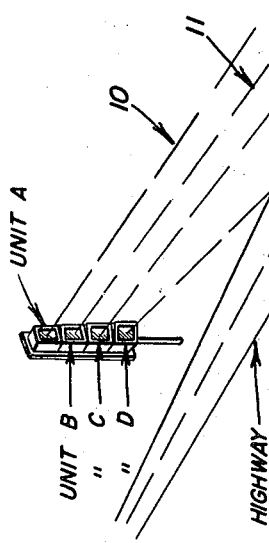
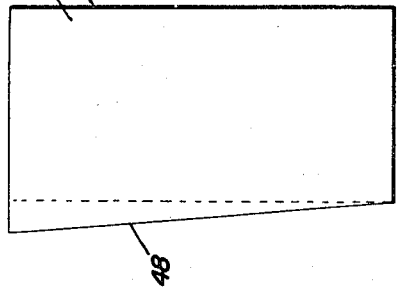
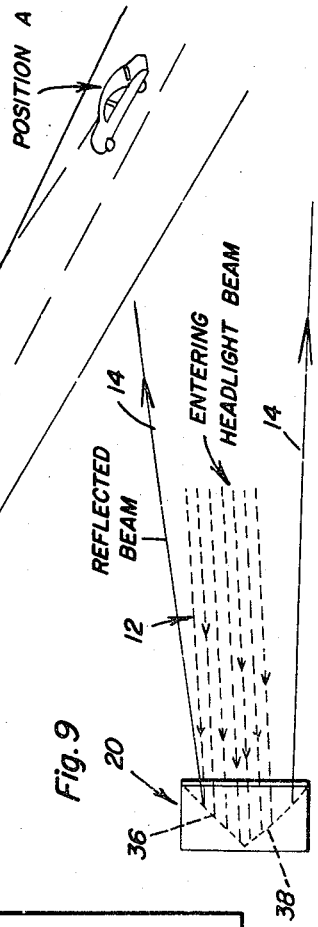
Billy J. McDonald
INVENTOR.

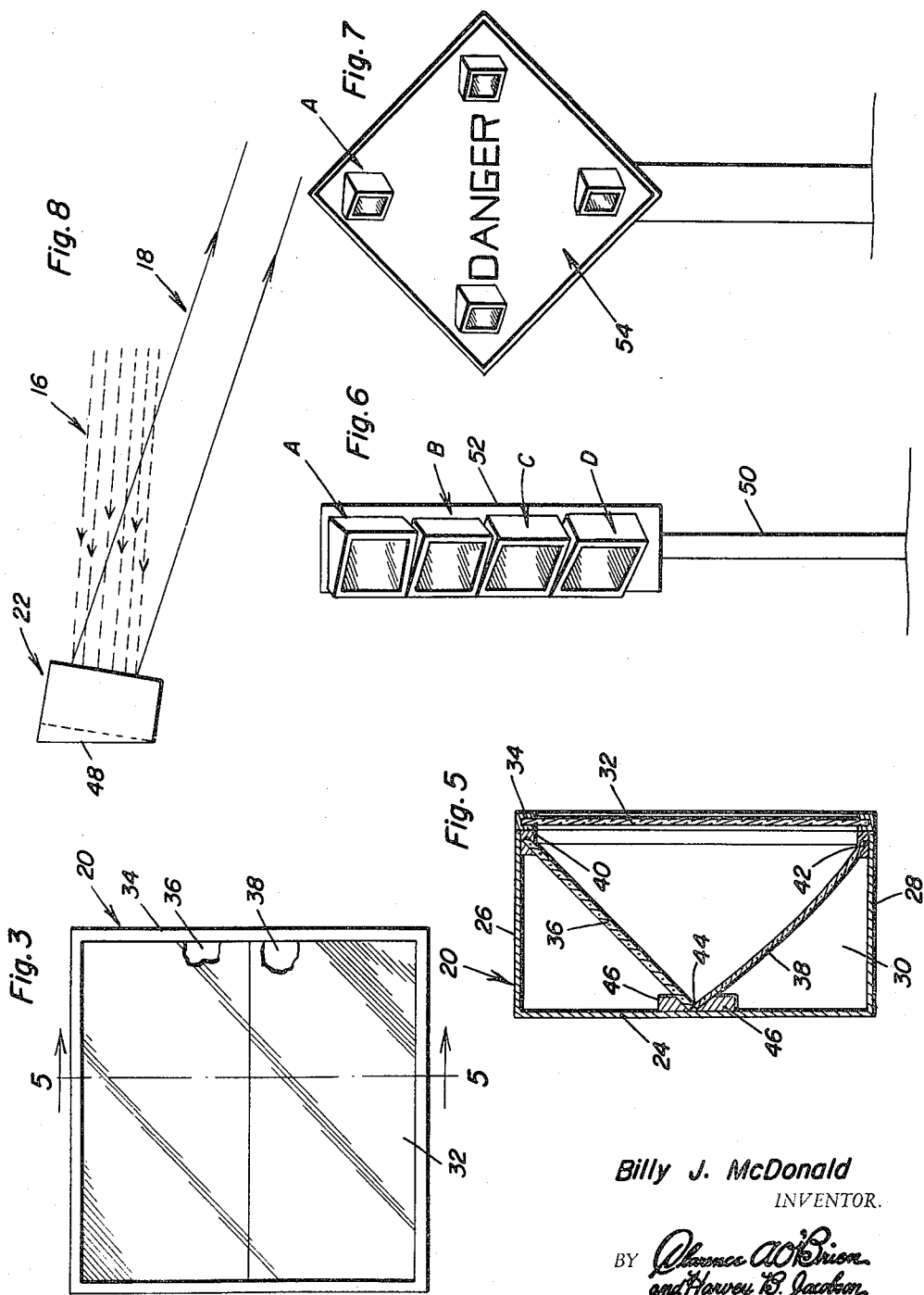

United States Patent Office 2,942,521
Patented June 28, 1960

2,942,521

HEADLIGHT REFLECTOR FOR HIGHWAYS

Billy J. McDonald, 1115 Cravens Bldg.,
Oklahoma City, Okla.

Filed Feb. 14, 1958, Ser. No. 715,411

3 Claims. (Cl. 88—79)

The present invention relates to certain new and useful improvements in vehicle headlight reflecting and safety warning devices characterized by novel and effective reflector units employed singly and collectively, as varying road conditions require, and which are adapted to be erected for more practical utility on varying types of highways, turnpikes, city streets and roads.

The improved units are constructed and designed to reflect vertically spread beams resulting in a separate flash for each headlight, that is, flashes of light which as seen by the driver simulate intermittent light rays from an electric flasher instead of a prolonged steady beam of light such as is had with currently employed roadside headlight reflectors. Principal locations for safe driving will be in conjunction with all types of warning signs, bridge abutments and wherever night driving hazards are to be encountered.

The number and color, if any, of the units is, of course, optional, each unit being erected, positioned and set to reveal the signalling flashes at desired places and points as the vehicle travels along the roadway.

Briefly, each unit is characterized by a suitable and appropriately constructed and shaped box-like case or housing. A pair of horizontally disposed generally rectangular mirrors are mounted within the confines of the case, the latter being open, but covered with a transparent window, at the front. In the preferred construction upper and lower mirrors are utilized and are cooperatively mounted in rearwardly converging right angular relationship and diverge toward the front window. It follows that, in use, each headlight beam of the approaching or oncoming vehicle enters the unit and falls upon one (either the upper or lower) mirror and is reflected to the other mirror and then reflected back to the driver of the stated vehicle.

In keeping with the underlying principles of the instant invention at least one mirror has a slight curve to give the reflected beam a spread in a vertical plane. For best results the curved reflecting surface of this mirror is tangent to a plane perpendicular to the complemental flat mirror. This arrangement of flat and curved mirrors is significant and important because if the two mirrors were both flat and set perpendicular to each other, the resulting reflected beam in the vertical plane would be parallel and coincidental to the headlight beam entering the front of the unit, regardless of the vertical entrance angle, but would not have the desired as well as significant vertical spread. Also such a reflected beam could not be properly seen by the driver who may be sitting in a position some two or three feet above the plane of the headlights of his car. By curving one of the mirrors as shown in the drawing and keeping it tangent to a 90° plane the principle of reflecting back parallel in the vertical plane is retained, but the vertical spread is attained so that the signalling reflection can be satisfactorily seen by the driver. Further and in connection with the above it is to be mentioned that the range of spread will be dependent upon the radius of curvature on the mirror which can, of course, be made to correspond with any desired degree or amount.

It is further pointed out here, that an identical spread of the beam in a vertical plane could be accomplished by curving both mirrors provided that they are both kept tangent to planes that are perpendicular to each other. Then too, it should be clear that regardless of whether the curvature feature is utilized in one or both mirrors, it can be concave, or convex and yet accomplish the desired vertical spread result.

With respect now to the reflected beam in a horizontal plane, this beam has no spread and will be seen by the driver at only one point along the roadway as will be evident from Fig. 1 of the accompanying drawing. This construction and arrangement makes it virtually impossible for the vehicle to move down the properly equipped roadway without passing through the beam of reflected light.

As will be hereinafter evident, novelty is predicated not on the construction of the individual reflector units but relies for outstanding significance on the complete ready-to-use warning signal or assemblage, that is, a stationary upright (or an equivalent vertical support) provided with a series of coordinated cooperating progressively acting reflector units concentrated to provide a bank or battery of units, each unit coming into play when an approaching vehicle comes into the bounds of operation of said battery of reflector units. To this end the units are assembled in group relationship and the properly angled mirrors in each come into play as the units— one after the other—pick up the vehicle headlights first at a distance and then step-by-step until the zone at which caution should begin, has been reached, in fact, passed through by the vehicle.

Other objects and features of the invention will become more readily apparent from the following description and the accompanying drawings.

In the drawings, wherein like numerals are employed to designate like parts throughout the views;

Fig. 1 is a view in perspective primarily diagrammatic in character showing a plurality or group of vertically arranged reflector units supported along a highway and illustrating an aspect of the concept to be referred to later in the description.

Fig. 2 is a perspective view of a preferred embodiment of one of the reflector units.

Fig. 3 is a front elevation of the same.

Fig. 4 is a plan view of the unit wherein the case is constructed for angular mounting as in Fig. 1.

Fig. 5 is a vertical section on the line 5—5 of Fig. 3 looking in the direction of the arrows.

Fig. 6 is an elevational view of the assembly or group arrangement of units depicted in Fig. 1 on a larger scale.

Fig. 7 is a front elevation of a modification showing the unit mounted on a so-called danger sign.

Fig. 8 is a plan view of the unit seen in Fig. 4 showing diagrammatically the incoming and outgoing beams.

Fig. 9 is a side elevational view diagrammatically showing the entering headlight beam and reflected beams where the case is rectangular in form.

With reference first to the schematic view of operation in Fig. 1 it will be evident that the legends applied to the objects represented are substantially self-explanatory. It may be added, however, that the single vehicle approaching the battery of reflecting units is denoted as having first, second, third and fourth positions or locations A, B, C and D. The numeral 10 designates the line of reflection from the unit A when the vehicle approaching is at location A. The numeral 11 designates the line of reflection from unit B when the same vehicle is at location or position B, and so on. Further reference to this diagrammatic phase of the concept will be touched upon later.

With brief reference to Fig. 9 the incoming or entering headlight beam or beams are denoted at 12 while the reflected beams are denoted at 14. The reflected beam in a vertical plane is symmetrical above and below a headlight beam at any vertical entrance angle. In the top plan Fig. 8 the unit is shown positioned at a horizontal mounting angle, the headlight entering beam being denoted at 16 and the reflected beam at 18. The angle of the reflected beam in this simple construction is equal to the entrance angle. It will be noted that as a vehicle moves along the roadway the entrance angle of the headlight beam changes continually in one direction, causing the angle of the reflected beam to change continually in the opposite direction. The reflected beam will be seen by the driver only at the instant it sweeps and flicks across the path of the vehicle. This point of sight is determined on each unit by the horizontal mounting angle.

In connection with the above description it is to be mentioned that the horizontal reflected beam is commensurate with the width of the reflecting unit. Consequently, each headlight will have separate reflected beams from each unit. Therefore, the driver will see two separate flashes from each unit.

With reference again to Fig. 1 it is to be pointed out the installation embodies a bank or battery of units and each individual unit A to D, inclusive, is set at a different horizontal mounting angle and each shows a flash to the driver at progressively functioning points along the roadway. Manifestly, the intervals between flashes will be determined by the differences in the horizontal mounting angles of the respective units.

The rectangular box-like unit of Figs. 2, 3 and 5 is denoted by the numeral 20 whereas the type for angular mounting (Figs. 1, 4, 6, 7 and 8) is denoted by the numeral 22.

With reference to the unit 20 this is characterized by a flat vertical back wall 24, flat top and bottom walls 26 and 28 and vertical flat end walls 30. This construction provides an open front case or casing the front of which is covered by a transparent window or panel 32 mounted in a frame 34 appropriately attached to the front of the case, said window to be either colored or plain. The upper horizontal reflector or mirror is denoted at 36, the lower one at 38.

The forward diverging edge portions of the mirrors are suitably anchored at 40 and 42 and the rearward abutting edges 44 are supported at 46 in centralized convergent relationship, as illustrated. The functioning of this form or construction of unit has already been touched upon and reference may therefore be again made to Fig. 9 revealing the intended mode of operation.

Insofar as the mirrors are concerned they are correspondingly arranged and mounted in the units 22 (alternatively the units A, B, C and D in Figs. 1 and 6). For this reason it is not necessary, it is believed, to repeat the showing of the mirrors. The difference here is in the construction of the rear angular mounting wall of the case or casing denoted by example at 48 in Figs. 4 and 8 in particular. Here again the mode of operation of incoming and outgoing beams 16 and 18 has already been explained. It is further clear that the purpose of Fig. 6 is to show in larger detail a supporting post or upright 50 having a suitable panel or head 52 thereon upon which the angularly mounted reflector units are arranged in group relationship, one directly above the other and all at the varying angles generally illustrated. This same idea is carried in the showing in Fig. 7 wherein the units A or 22 as the case may be are mounted on the surface of the diamond shaped danger or warning sign 54. The views in the drawing show this horizontal mounting angle as being set on the outside case of the unit. This has been thought to be the easiest and most practical method of construction and mounting. However, the same result can be achieved by setting the mirrored surfaces at the desired angle within the confines of the case or housing. With the arrangement depicted the advantages are derived from the fact that all of the outside cases could be set parallel to each other in systematic assembly form.

It is believed that by considering the stated objectives already given, and the description of the details in the specification taken in conjunction with the drawings, a clear and comprehensive understanding of the principles and improved results will be had. Therefore, a more lengthy description is deemed to be unnecessary.

Minor changes in shape, materials, and rearrangement of components may be resorted to in actual practice without departing from the spirit of the invention or the scope of the invention as hereinafter claimed.

What is claimed as new is as follows:

1. Vehicle headlight reflecting means for use in conjunction with varying types of highway warning signs and caution devices, bridge abutments and the like comprising a fixed vertical support provided with an elevated group of closely coordinated progressively functioning headlight beam reflecting units, each unit embodying a case fixed on said support and housing cooperating reflecting surfaces one in a plane above the other and in horizontally positioned convergent relationship, each unit being supported and set at a horizontal angle different from the horizontal angle of mounting of the other units, said units serving one at a time to reveal a momentary flash signal for each headlight to the driver of an approaching vehicle at progressively nearing stages in the path of movement toward said compositely grouped units.

2. A vehicle headlight reflecting and warning device adapted for installation alongside a highway at a potential source of danger comprising a fixed vertical support, a plurality of headlight beam reflecting units mounted on said support at upper, lower and intermediate portions of the support, said units coming into play automatically to receive and then flash back headlight beam warning rays, said units functioning from the uppermost unit down to the lowermost unit, each unit being set at a different horizontal mounting angle to reveal a flash of light to the driver of the oncoming vehicle at different points of approach so that the driver may pick up the first warning signals, travel a distance further, pick up the second warning signals and so on until the beginning of the danger zone has been approached, the intervals between the signalling flashes being obtained by the difference in the horizontal mounting angle of said units, each unit comprising a pair of elongated horizontal companion upper and lower mirrors housed within the confines of an open front enclosing case, said mirrors being fixed in said case at an angle to each other with their cooperating reflecting surface portions converging so that a headlight beam from the approaching vehicle entering the case from the front, falls upon one mirror, is reflected to the other mirror and then reflected back to the driver of the vehicle so as to present a momentary separate flash of light first from one and then the other headlight, said reflector beam being seen by the driver only at the instant it flashes across the path of forward movement of the vehicle.

3. The structure defined in claim 2 and wherein said support comprises a fixed vertical post, the reflecting units being arranged directly one above the other in coplanar relationship, each case having top, bottom, side and back walls, said front being open but spanned by a transparent window, the depth of the case being such that the back wall slants at a predetermined horizontal angle relative to the vertical axis of the support post and relative to the flat open front.

(References on following page)

References Cited in the file of this patent

UNITED STATES PATENTS

| | | |
|---|---|---|
| 1,377,161 | Vanderbeek | May 3, 1921 |
| 1,743,835 | Stimson | Jan. 14, 1930 |
| 1,991,054 | Hampke | Feb. 12, 1935 |
| 2,094,741 | Grussendorf et al. | Oct. 5, 1937 |
| 2,178,715 | Arbuckle | Nov. 7, 1939 |
| 2,250,620 | Bone | July 29, 1941 |

FOREIGN PATENTS

| 133,225 | Australia | June 20, 1949 |
|---|---|---|